United States Patent
Kagayama et al.

[11] Patent Number: 5,861,877
[45] Date of Patent: Jan. 19, 1999

[54] ELECTRIC PEN THAT FUNCTIONS AS HAND-HELD PRINTER WITH MULTIPLE COLORS AND ADJUSTABLE PRINT AREA

[75] Inventors: Shigeru Kagayama, Owariasahi; Takemi Yamamoto, Nagoya, both of Japan

[73] Assignee: Brother Kogyo Kabushiki Kaisha, Nagoya, Japan

[21] Appl. No.: 639,446

[22] Filed: Apr. 29, 1996

[30] Foreign Application Priority Data

Apr. 27, 1995 [JP] Japan .................................. 7-103384

[51] Int. Cl.⁶ .............................. G09G 5/00; G01D 15/16
[52] U.S. Cl. ............................................ 345/179; 346/143
[58] Field of Search ................................. 345/179; 178/18, 178/188; 358/471, 472, 473, 296; 346/143

[56] References Cited

U.S. PATENT DOCUMENTS

| | | | |
|---|---|---|---|
| 3,376,551 | 4/1968 | Armbruster . | |
| 3,767,020 | 10/1973 | Rowe | 346/143 |
| 4,168,533 | 9/1979 | Schwartz . | |
| 4,211,012 | 7/1980 | Alles et al. | 346/143 |
| 4,663,639 | 5/1987 | Owen et al. | 347/55 |
| 4,949,283 | 8/1990 | Yamauchi et al. | 395/113 |
| 5,012,349 | 4/1991 | De Fay | 358/473 |
| 5,124,801 | 6/1992 | Shinmura et al. | 358/473 |
| 5,311,208 | 5/1994 | Burgen et al. | 145/163 |
| 5,446,559 | 8/1995 | Birk | 358/473 |
| 5,455,901 | 10/1995 | Friend et al. | 345/179 |
| 5,544,045 | 8/1996 | Garland et al. | 358/471 |
| 5,548,092 | 8/1996 | Shriver | 178/18 |
| 5,581,783 | 12/1996 | Ohashi | 358/473 |

FOREIGN PATENT DOCUMENTS 4-94693   8/1992   Japan .

Primary Examiner—Jeffery Brier
Assistant Examiner—Paul A. Bell
Attorney, Agent, or Firm—Oliff & Berridge, PLC

[57] ABSTRACT

An electric pen is used as a data input/output device with the same feel as though writing on paper with an ordinary pen. The electric pen can be used in conjunction with an external data processor, such as a compact portable electric note book. Hand written characters inputted by the electric pen is data processed in the external data processor and characters can be printed in a designated print area on paper or the like in print form.

19 Claims, 6 Drawing Sheets

ELECTRIC PEN THAT FUNCTIONS AS HAND-HELD PRINTER WITH MULTIPLE COLORS AND ADJUSTABLE PRINT AREA

BACKGROUND OF THE INVENTION

1. Field of the Invention

The present invention relates to an electric pen used as a portable personal information device.

2. Description of the Related Art

There have been known a variety of pointing devices for inputting desired positional and direction data to a computer. One typical example of a pointing device is a mouse unit. In one type of mouse unit, positional and direction data are inputted to the computer by moving the mouse unit itself over the top of a surface such as a desk top. Moving the mouse unit in this way rotates a ball mounted internally to the mouse unit. The direction and amount that the ball rotates is transmitted to a roller in abutting contact with the ball. In this way, the distance and direction in which the mouse unit moves is detected and inputted to the computer. There is also known an optical mouse unit which emits light to illuminate a mouse pad provided with a special lattice at its upper surface. The distance and direction of movement of the mouse unit can be determined by the pattern of reflected light and inputted to the computer.

Recently, input devices that are more user compatible than mouse units have been developed. One example is pen input systems which include a tablet and a special pen. The tablet can be a liquid crystal display or a special optical tablet and is provided with a transparent conductive film. The special pen is provided with a conductive tip. The position and speed of the pen tip can be detected by bringing the pen tip into contact with the transparent conductive film.

Various output devices have been used with these input devices. Normally, output devices of ink jet type, electrophotographic type, silver halide photographic type, or thermal transfer type are used for outputting a hard copy. However, all of these devices are desk top units and therefore are not portable.

Japanese Utility Model Application (KOKAI) No. HEI-4-94693 describes an electric pen including a compact ink jet type printing mechanism. Because the printing mechanism is formed in the shape of a pen, a user can electrically print in a desired color with the same feel as though writing with a pencil or ordinary pen. The electric pen is provided with an analog type color-adjustment switch which a user operates to select a desired color. The electric pen is also provided with an ejection switch which the user presses to cause the electric pen to eject droplets of colored ink. The droplets will impinge on a print medium at a position indicated by the user pointing the electric pen. However, the electric pen is an independent electric writing tool and is only usable to print when the user indicates what to print.

There has been a demand for a device which allows a user to input and output to and from an external data processor, such as a portable information device, with the same feel as through writing with a pen. However, such a device with sufficient functions has yet to be realized.

SUMMARY OF THE INVENTION

In view of the foregoing, it is an object of the present invention to provide an electric pen that can be used in conjunction with an external data processor, such as a compact portable electric notebook used in work or daily life.

It is another object of the present invention to provide an electric notebook that is able to transmit data directly to a portable electric pen and print at a desired position indicated by the user.

It is still another object of the present invention to provide an input device wherein a user can input data with the same feel as though writing on paper with an ordinary pen.

To achieve the above and other objects, there is provided an electric pen which includes a body holdable by a user and movable by the user according to images, a position detector for measuring, based on movement of the body, positional displacement of the body to produce a signal representing the images, signal detection means for detecting the signal from the position detector, and printing means for printing the images according to movements of the body by the user and based on the signal detected by the signal detection means.

The electric pen may further includes data transmission/reception means for transmitting data to and receiving data from an external data processor. The external data processor converts the signal detected by the signal detection means into a print signal. Control means is also provided for controlling the data transmission/reception means to transmit the signal detected by the signal detection means to the external data processor and to receive the print signal converted by the external data processor based on the signal. The control means further controls the printing means to print the images based on the print signal received from the external data processor.

The signal produced by the position detector may be representative of characters. In this case, the external data processor converts the signal representative of characters into the print signal. The print signal is obtained by extracting characteristics of the characters and comparing extracted characteristics of the characters with predetermined patterns.

Preferably, print position setting means is further provided for setting a print area where the user wants the image to be printed on a print medium. The rectangular print area is set by the print position setting means by indicating two opposing points, which, when connected, form a diagonal of the rectangular print area. The images are printed in the rectangular print area in accordance with movements of the body within the rectangular print area.

The position detector further measures speeds of the body, wherein movements of the body within the rectangular print area are predicted based on the speeds of the body measured by the position detector.

BRIEF DESCRIPTION OF THE DRAWINGS

The above and other objects, features and advantages of the invention will become more apparent from reading the following description of the preferred embodiment taken in connection with the accompanying drawings in which:

FIG. 1(*a*) is a plan view showing an electric pen according to an embodiment of the present invention;

FIG. 1(*b*) is a cross-sectional view showing the electric pen of FIG. 1(*a*);

DETAILED DESCRIPTION OF THE PREFERRED EMBODIMENT

An electric pen according to a preferred embodiment of the present invention will be described while referring to the accompanying drawings wherein like parts and components are designated by the same reference numerals to avoid duplicating description.

Figure 1A:
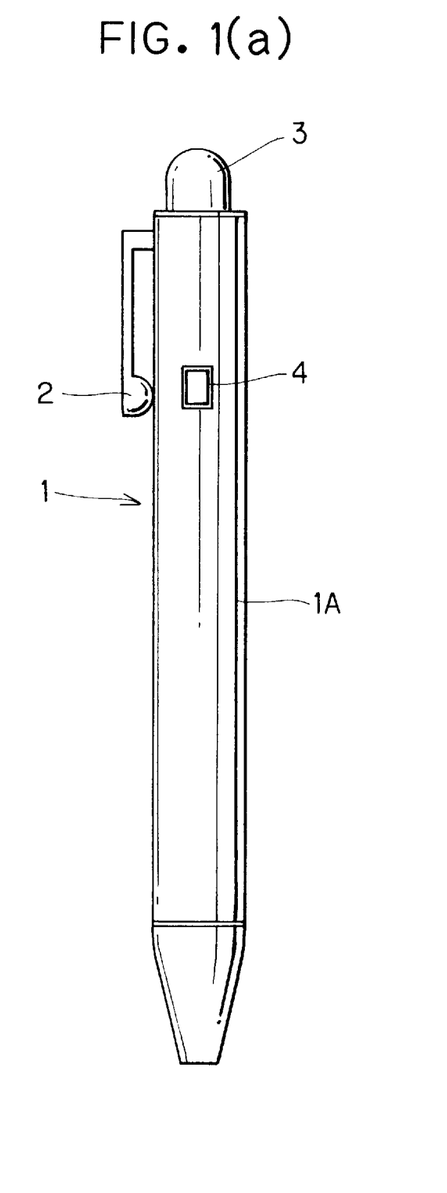
Figure 1B:
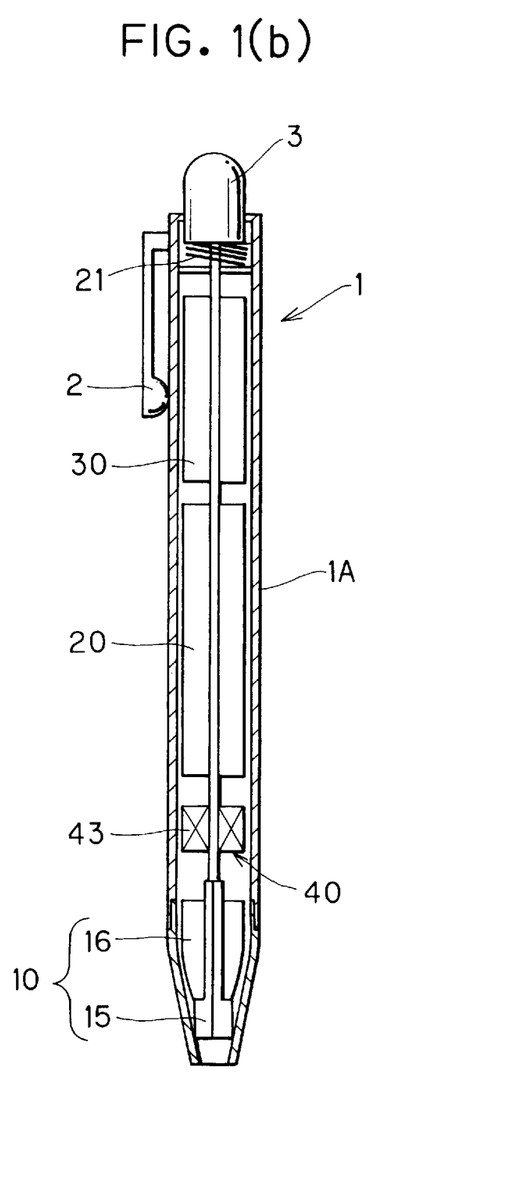

FIGS. 1(a) and 1(b) schematically show an electric pen 1 according to an embodiment of the present invention. FIG. 1(a) is a plan view showing an electric pen according to the embodiment. FIG. 1(b) is a cross-sectional view showing the electric pen of FIG. 1(a). As shown in FIG. 1(a), the electric pen 1 has the external appearance of an ordinary pen and includes a pen body 1A. A clip 2, a switch 3, and a transmission window 4 are provided to the pen body 1A. The clip 2 is for clipping the electric pen 1 to, for example, the pocket of a user, in the same manner as an ordinary pen, thereby providing portability to the electric pen 1. The switch 3 is an electric switch by which a user can turn the electric pen 1 on and off by clicking. The transmission window 4 is an optical aperture for performing infrared transmission between the electric pen 1 and an external portable data processor 50 (to be described later).

As shown in FIG. 1(b), the pen body 1A houses a printing mechanism 10, a control unit 20, a transmission/reception unit 30, and a position detection unit 40. The printing mechanism 10 includes a four-color ink jet head 15 and an ink tank 16, which are disposed uniformly around a central axis of the electric pen 1. The ink jet head 15 can be either a thermal ink jet type or a piezoelectric element type head. Alternatively, although more housing space would be required, an electrophotographic type, a jet toner type for printing directly with toner, a sublimation type, or a thermal type head could be used as the ink jet head 15. The ink stored in the ink tank 16 can be water-based ink, solvent type ink, or hot-melt ink and can be selected to best suit the type of print medium to be used. Components of the printing mechanism 10 are provided independently from the pen body 1A and can be freely detached from the pen body 1A for replenishing ink or for replacing the ink jet head 15.

The position detection unit 40 is disposed near the printing mechanism 10. The position detection unit 40 is constructed mainly from a sensor portion 43, which may be an acceleration sensor, a laser Doppler sensor, or other sensor. If the portable data processor 50 is provided with a tablet, then an optical sensor or tracking ball can be used as a sensor in the sensor portion 43. The control unit 20 is disposed adjacent to the position detection unit 40.

Figure 2:
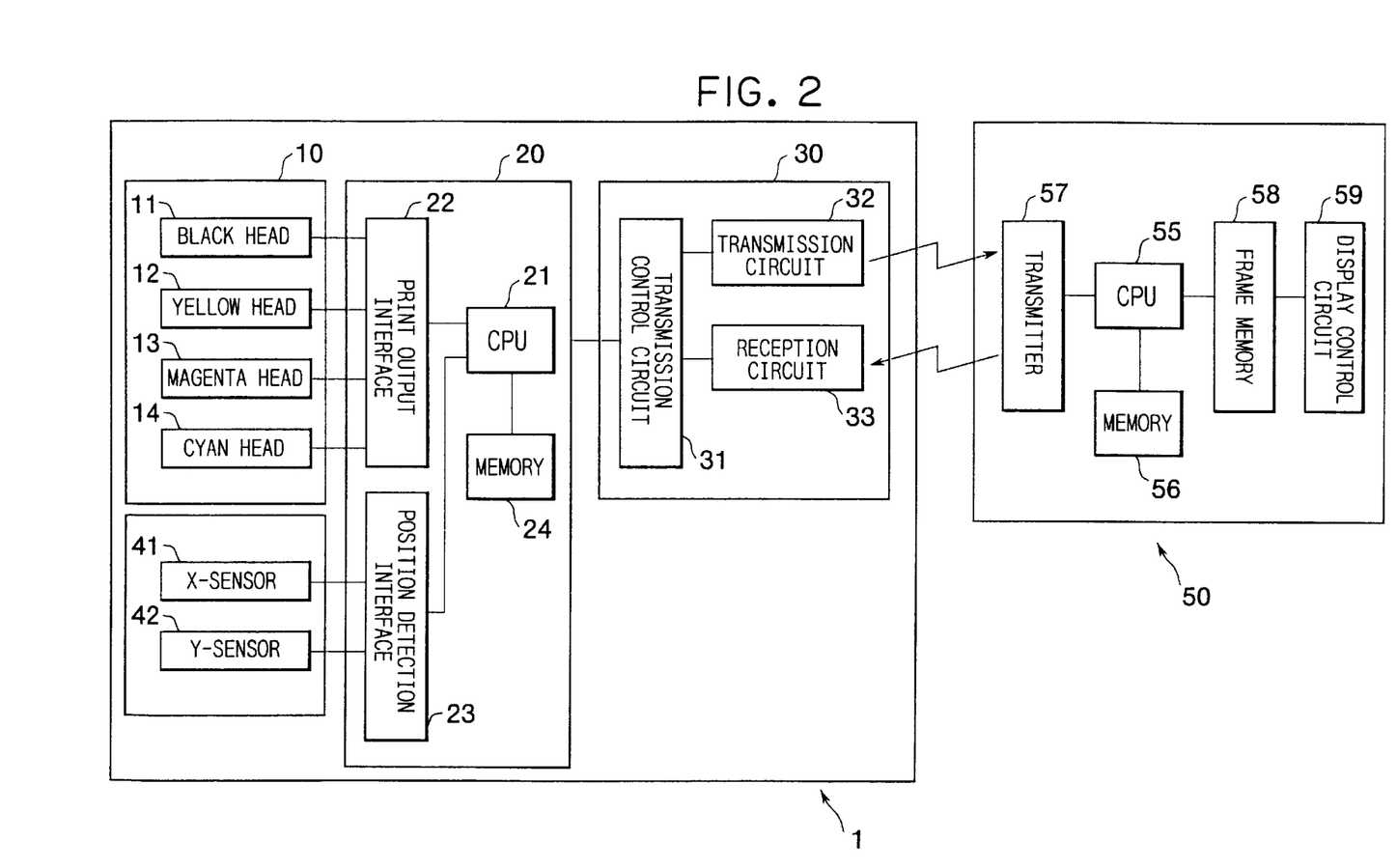
FIG. 2 is a block diagram showing components of the electric pen and of a portable data processor used with the electric pen.

Next, components of the electric pen 1 and their interconnection will be described in more detail while referring to FIG. 2. FIG. 2 is a block diagram showing components of the electric pen 1 and of a portable data processor 50 used with the electric pen 1. The control unit 20 includes a print output interface 22, a position detection interface 23, a CPU 21, and a memory 24. The printing mechanism 10 includes four print heads: a black head 11, a yellow head 12, a magenta head 13, and a cyan head 14, which are connected to the CPU 21 of the control unit 20 via the print output interface 22. The position detection unit 40 includes an X-sensor 41 for detecting position in the X-axis direction and a Y-sensor 42 for detecting position in the Y-axis direction. The X-sensor 41 and the Y-sensor 42 are connected to the CPU 21 of the control unit 20 via the position detection interface 23. The transmission/reception unit 30 includes a transmission control circuit 31, a transmission circuit 32, and a reception circuit 33. The transmission control circuit 31 is connected to the CPU 21 of the control unit 20.

Figure 3:
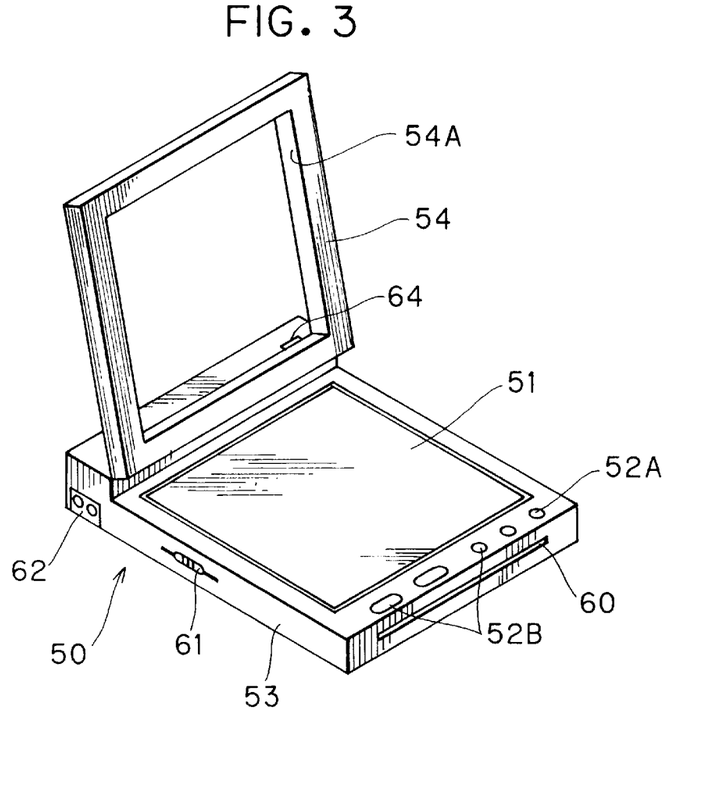
FIG. 3 is a perspective view showing the portable data processor.

Next, the portable data processor 50 will be described while referring to FIGS. 2 and 3. FIG. 3 is a perspective view showing the portable data processor 50. The portable data processor 50 is a compact data processor, such as an electronic notebook or personal information tool, that is capable of storing or processing data inputted or outputted by a user.

As shown in FIG. 3, the portable data processor 50 includes a substantially rectangular shaped housing 53. An upper cover 54 for opening and closing the housing 53 is provided to the upper portion of the housing 53. A large rectangular window 54A is provided in the upper cover 54. A liquid crystal display (LCD) 51 is disposed in the center of the housing 53. A power switch 52A and various selection buttons 52B are provided adjacent to the LCD 51 at the upper-front surface of the housing 53. An IC memory card 60, an LCD controller 61, and a transmission jack 62 are provided at the sides of the housing 53. Further, a transmission window 64 is provided to the upper-rear surface of the housing 53.

The LCD 51 can be of a TFT (thin-film transistor) type or an STN type. The LCD controller 61 is for regulating contrast, brightness, and the like of the LCD 51. The transmission window 64 is an optical window for performing infrared transmission in the same manner as the transmission window 4 of the electric pen 1. The transmission jack 62 is for connecting the portable data processor 50 to a telephone circuit. The IC card 60 is a memory card storing an application software used in the portable data processor 50.

As shown in FIG. 2, internal components of the portable data processor 50 include a transmitter 57, a CPU 55, a memory 56, a frame memory 58, and a display control circuit 59. The transmitter 57 controls wireless transmission between the portable data processor 50 and the electric pen 1. The CPU 55 controls all components of the portable data processor 50 and also controls a variety of calculations. The memory 56 stores programs to be executed in cooperation with the CPU 55 and also stores numeric data and image data. The frame memory 58 temporarily stores data to be displayed on the LCD 51. The display control circuit 59 controls display of the LCD 51.

Next, the operation of the electric pen 1 and the portable data processor 50 will be described. First, the user presses the switch 3 at the tip of the electric pen 1, thereby entering the electric pen 1 into an operable condition. As a result, the internal units of the electric pen 1 are energized so that input-output functions of the electric pen 1 can be started. Next, the user manipulates the power switch 52A to turn on power of the portable data processor 50, thereby bringing the portable data processor 50 into an operable condition.

First, how data is inputted using the electric pen 1 will be described. The user grasps the pen body 1A of the electric pen 1 and moves the electric pen 1 over, for example, the LCD 51 of the portable data processor 50 to input desired characters or images. It should be noted that the user need not input via the LCD 51, but could instead input by moving the electric pen 1 over another surface such as a notebook, a table top, or the palm of his or her hand as if writing with an ordinary pen.

The sensor portion 43 of the position detection unit 40 measures positional displacement and speed that accompanies movement of the electric pen 1 and outputs a signal accordingly. The signal is transmitted to the portable data processor 50 via the transmission/reception unit 30 and the transmitter 57 of the portable data processor 50. The related processes will be described below with reference to the flowchart shown in FIG. 5. In the following description and in the drawings, individual steps of the flowcharts will be referred to as Si, wherein i represents the number of the individual step. For example, step 1 will be referred to as S1.

Figure 5:
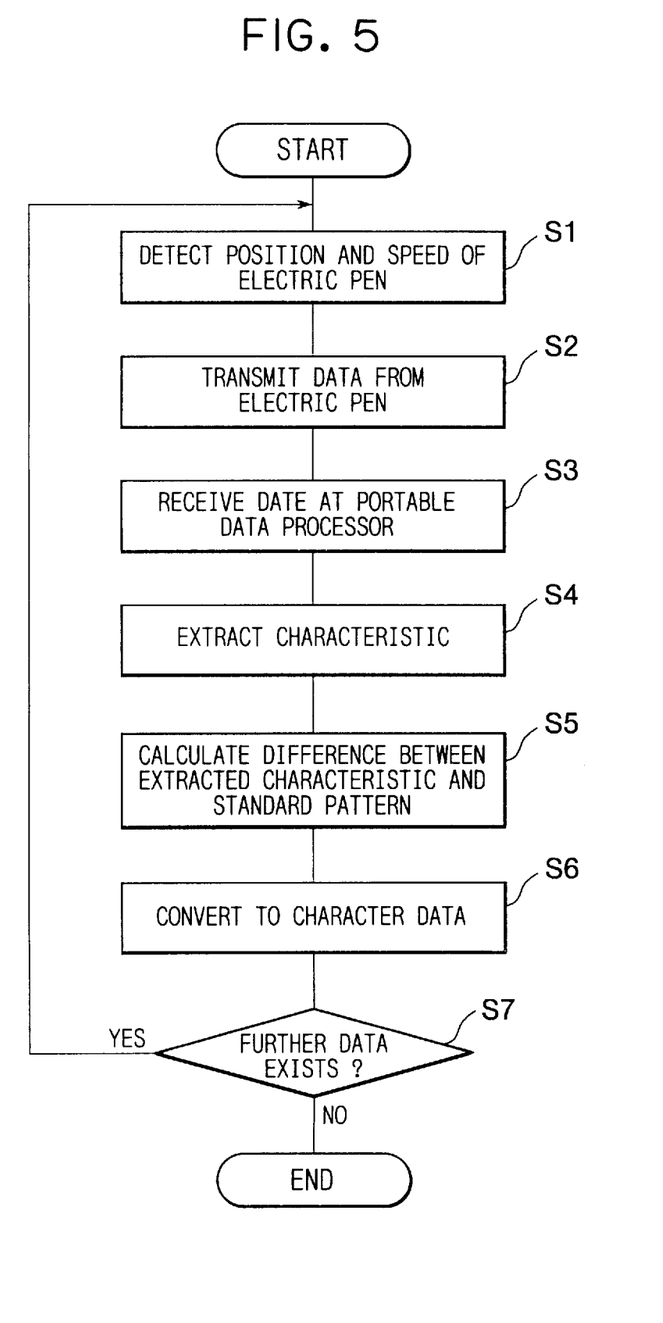
FIG. 5 is a flowchart representing processes executed during input of data.

The signal produced by detection of the sensor portion 43 is sent to the CPU 21 via the position detection interface 23. The control unit 20 processes the signal and prepares positional data and speed data in S1. This data is transmitted from the transmission/reception unit 30 to the portable data processor 50 in S2. The transmitted data is received by the transmitter 57 of the portable data processor 50 in S3.

The positional data and the speed data inputted to the portable data processor 50 is converted into vector data and characteristics including the stroke order are extracted in S4. Difference calculation is performed in S5 to consider the degree to which the extracted characteristics match with prestored standard patterns. A learning function can be included in the programs stored in the memory 56 to improve matching capability. By performing these processes, character recognition and shape recognition are performed and the inputted data is converted into character data or image data in S6. Various processes can then be performed on the character data and the image data using the portable data processor 50.

Figure 4:
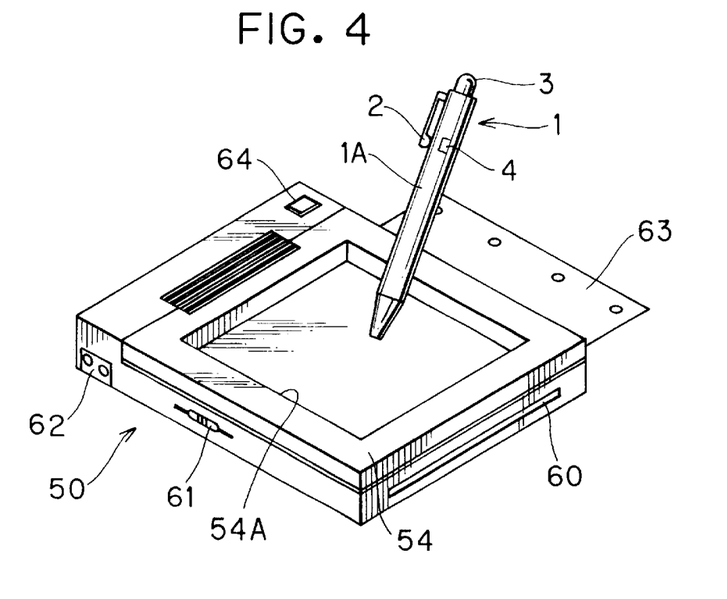
FIG. 4 is a perspective view showing the electric pen and the portable data processor when data is outputted onto a sheet using the electric pen.
Figure 6:
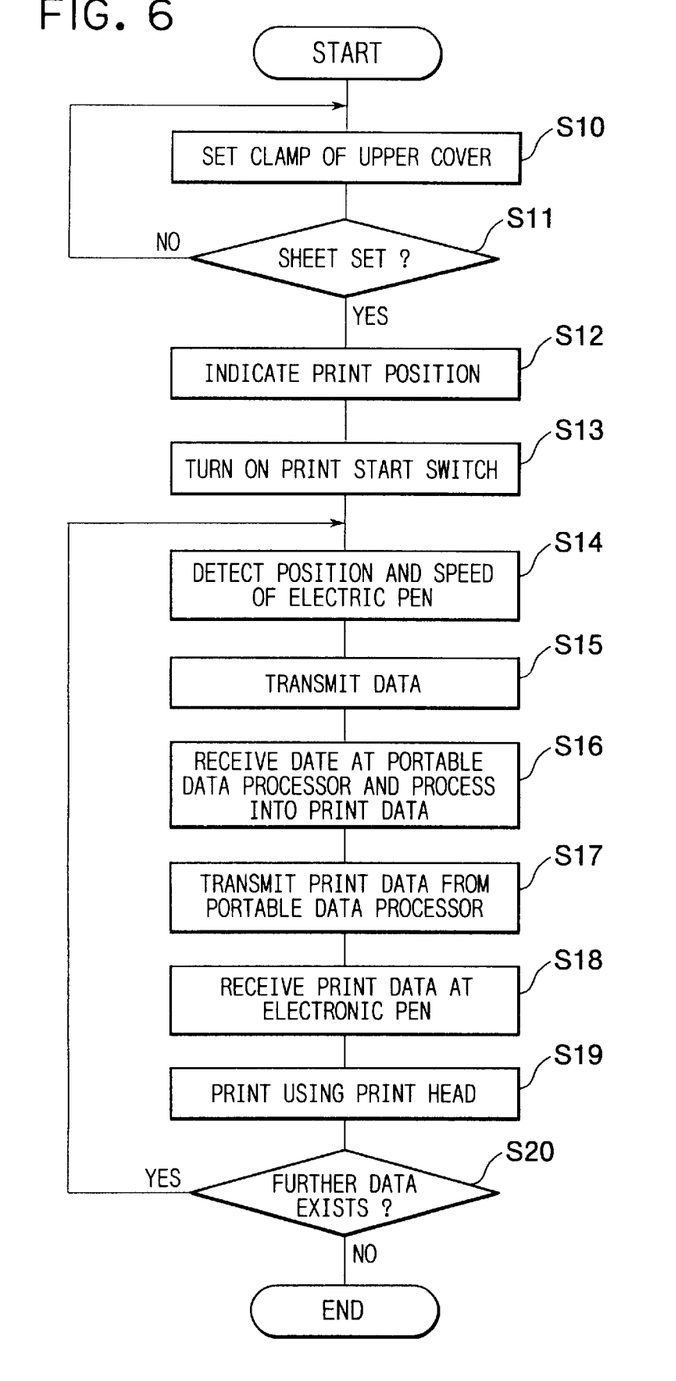
FIG. 6 is a flowchart representing processes executed during output of data.

Next, the method of outputting data will be described while referring to FIGS. 4 and 6. FIG. 4 is a perspective view showing the electric pen 1 and the portable data processor 50 when data is outputted according to the present embodiment. FIG. 6 is a flowchart representing processes executed during output. The user opens the upper cover 54 and positions a sheet 63, which serves as a print medium, on the LCD 51. The user then lowers the upper cover 54 in S10 so that a clamp not shown in the drawings is set, thereby fixing the sheet 63 so that it can not shift out of position. Then, whether or not a sheet 63 is disposed between the upper cover 54 and the LCD 51 is determined in S11 by a sensor not shown in the drawings. If so (S11:YES), then the user indicates in S12 the print position where the user wants data to be printed on the sheet 63. The user can do this by manipulating the electric pen 1 through the window 54A to, for example, indicate two opposing dots, which, when connected, form the diagonal of a rectangular print area.

Printing is started in S13 when the user presses the switch 3. The user grasps the pen body 1A of the electric pen 1 and, through the window 54A of the upper cover 54, moves the tip of the electric pen 1 reciprocally left and right from one edge of the rectangular print area to the other. The sensor portion 43 of the position detection unit 40 detects movement of the electric pen 1 and inputs it to the CPU 21 of the control unit 20, which calculates positional and speed data in S14. The calculated data is transmitted in S15 to the portable data processor 50 as infrared light by the transmission control circuit 31 of the transmission-reception unit 30. Data transmitted as infrared light is received by the transmitter 57 of the portable data processor 50 in S16 and then processed into print data by the CPU 55.

Then, the resultant print data corresponding to the positional and speed data is transmitted to the transmitter 57 in S17. Various processing methods can be used for producing the print data. In one possible method, data on the present position point is retrieved from the image data stored in the memory 56. Data on speed of the electric pen 1 can be used to predict the direction in which the user will move the electric pen 1. Therefore, data should be retrieved giving priority to predicted direction. Also, by calculating acceleration based on the speed data, stopping points and changes in direction of the electric pen 1 can also be predicted so that positional data can be more accurate, resulting in good printing output. Printing can be improved by providing a function for recognizing handwriting characteristics and other traits particular to the user and learning from them to improve matching capability.

The transmitter 57 performs wireless transmission of the print data to the reception circuit 33 of the electric pen 1 and the CPU 21 picks up the print data in S18. The CPU 21 performs printing by controlling the black head 11, the yellow head 12, the magenta head 13, and the cyan head 14 according to the print data. That is, the actuators of each head are driven to eject ink based on the print data of its color. As a result, color printing of characters and images is performed on the surface of the sheet 63 in S19. That is, movement of the electric pen 1 is retrieved as positional data and speed data and image data produced accordingly. The image data corresponding to the positional data and speed data is transmitted back to the electric pen 1. The printing mechanism 10 of the electric pen 1 is operated according to data transmitted in this way back and forth from the electric pen 1 to the portable data processor 50, thereby allowing printing at corresponding positions on the sheet 63. The user can output characters and images as necessary and according to his or her desire within the rectangular print area by moving the electric pen 1.

After the above-described processes have been completed, when further print data exists (S20:YES), then the processes from S14 through S19 are repeated. On the other hand, if no further print data exists (S20:NO), then this routine is completed.

According to the above-described processes, a user can input data on any flat surface with the same feel as writing characters and the like with an ordinary pen. No special tablet is needed. Further, a user can print characters and images by moving the electric pen 1 over the area where he or she desires the characters and images to be printed.

While the invention has been described in detail with reference to a specific embodiment thereof, it would be apparent to those skilled in the art that various changes and modifications may be made therein without departing from the spirit of the invention, the scope of which is defined by the attached claims.

For example, character recognition was performed at an external portable data processor in the embodiment. However, character recognition could be performed in the electric pen 1 by providing the electric pen 1 with a processing circuit for this purpose. Because this will increase the intelligence of the electric pen 1, it can be used as an independent unit for performing various processes without concern for selection of the external data processor.

In the embodiment, the sheet is sandwiched between the upper surface of the LCD and the cover. However, the present invention can be applied to a system wherein the sheet need not be used at any particular place. For example, if easier for the user, the electric pen and the sheet can be used separated from the portable data processor, as long as the electric pen and the portable data processor 50 are within transmission range.

Figure 7:
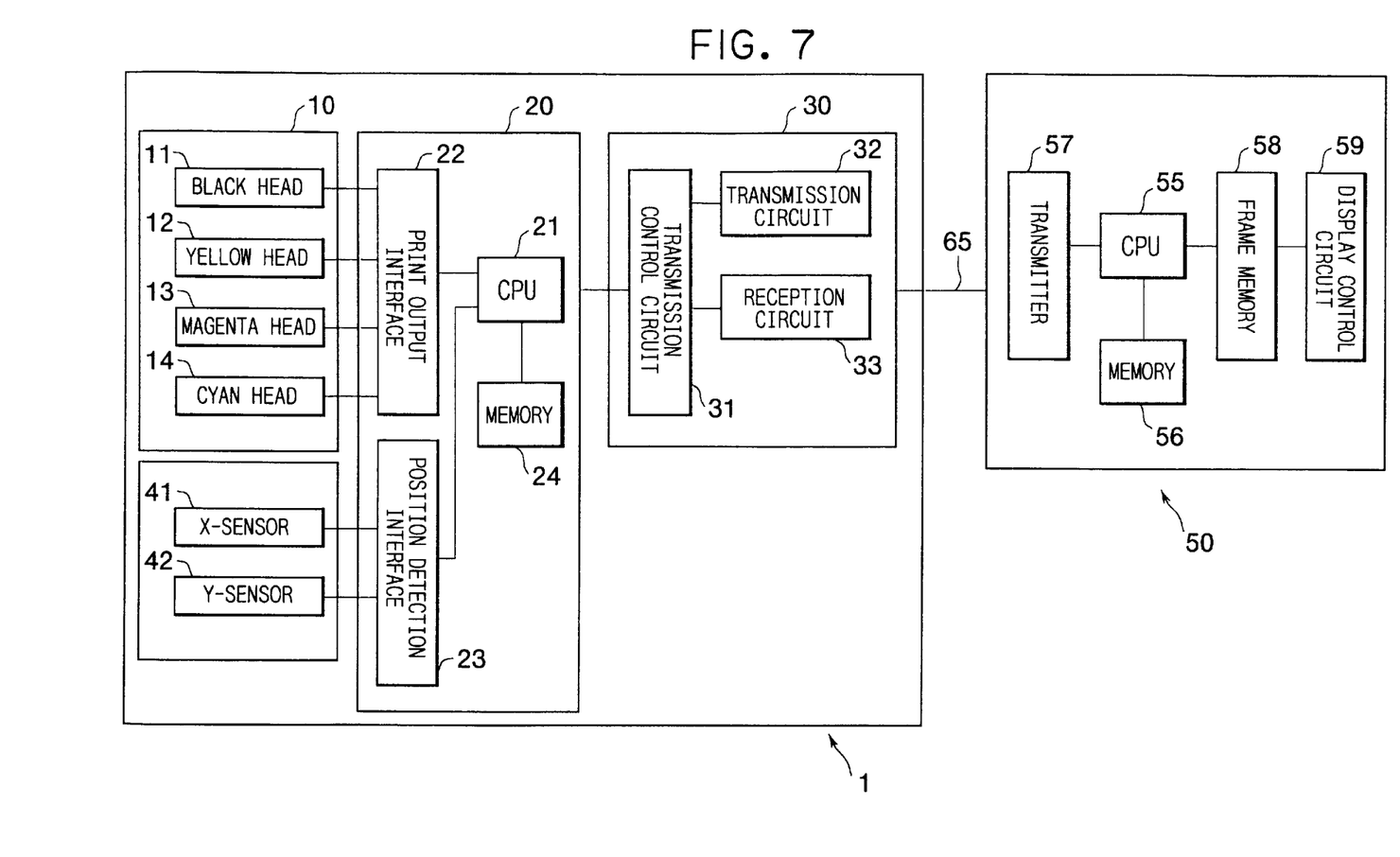
FIG. 7 is a block diagram showing components of the electric pen and a portable data processor used with the electric pen according to another embodiment of this invention.

Further, in the embodiment, data was transmitted between the electric pen 1 and the portable data processor 50 using infrared ray transmission. However, transmission could be performed via a conductive wire 65 connecting the electric pen 1 and the portable data processor 50 as shown in FIG. 7. Although this would slightly reduce freedom of use, costs will decrease. Also, such a configuration would be unaffected by surrounding electric noise so that good transmission is possible. Also, unauthorized surveillance of transmitted data could be prevented.

What is claimed is:

1. An electric pen having a data input mode and a data output mode, the electric pen comprising:

a body holdable by a user and positionally movable by the user to draw images when the electric pen is in the data input mode, said body having an internal space;

a position detector that measures positional displacement and speed of said body that accompanies movement of said body by the user to draw said images, said position detector producing a signal based on the measured positional displacement and speed of said body;

signal detection means for detecting the signal produced by said position detector based on the measured positional displacement and speed of said body; and printing means for printing said images based on the signal detected by said signal detection means when the electric pen is in the data output mode, said printing means being disposed in the internal space of said body.

2. An electric pen according to claim 1, further comprising:

data transmission/reception means for transmitting data to and receiving data from an external data processor, the external data processor having a function for converting the signal detected by said signal detection means into print signal; and control means for controlling said data transmission/reception means to transmit the signal detected by said signal detection means to the external data processor and to receive the print signal converted by said external data processor based on the signal, and for controlling said printing means to print the images based on the print signal received from the external data processor.

3. An electric pen according to claim 2, wherein the signal produced by said position detector is representative of characters, and wherein said external data processor converts the signal representative of characters into the print signal, the print signal being obtained by extracting characteristics of the characters and comparing extracted characteristics of the characters with predetermined patterns.

4. An electric pen according to claim 2, further comprising print position setting means for setting a rectangular print area where the image is printed on a print medium, said print position setting means setting the rectangular print area by indicating two opposing points that form a diagonal of the rectangular print area when connected.

5. An electric pen according to claim 4, wherein the images are printed in the rectangular print area in accordance with movements of said body within the rectangular print area.

6. An electric pen according to claim 5, wherein movements of said body within the rectangular point area are predicted based on the speeds of said body measured by said position detector.

7. An electric pen according to claim 1, wherein said printing means has a color printing capability.

8. An electric pen according to claim 2, wherein said data transmission/reception means has a wireless data transmission/reception capability.

9. An electric pen according to claim 2, wherein said data transmission/reception means comprises a cable connecting the electric pen to the external data processor.

10. An electric pen having a data input mode and a data output mode, the electric pen comprising:

a body holdable by a user and positionally movable by the user over a surface to draw images when the electric pen is in the data input mode, the body having an internal space;

a position detector that measures positional displacement and speed of the body that accompanies movement of the body by the user to draw the images, the position detector producing a signal based on the measured positional displacement and speed of the body;

a signal detector that detects the signal produced by the position detector based on the measured positional displacement and speed of the body; and a printing mechanism disposed in the internal space of the body that prints the images based on the signal detected by the signal detector when the electric pen is in the data output mode.

11. An electric pen according to claim 10, wherein the printing mechanism comprises an ink jet head and an ink source.

12. An electric pen according to claim 10, wherein the printing mechanism comprises a plurality of color print heads and an ink source.

13. An electric pen according to claim 10, further comprising:

data transmission/reception means for transmitting data to and receiving data from an external data processor, the external data processor converting the signal detected by the signal detector into a print signal; and control means for controlling said data transmission/reception means to transmit the signal detected by the signal detector to the external data processor and to receive the print signal converted by the external data processor based on the signal, and for controlling the printing mechanism to print the images based on the print signal received from the external data processor.

14. An electric pen according to claim 13, wherein the data transmission/reception means transmits and receives data via infrared ray transmission.

15. An electric pen according to claim 13, wherein the data transmission/reception means transmits and receives data via a conductive wire connecting the electric pen and the external data processor.

16. In combination:

an external data processor; and an electric pen having a data input mode and a data output mode, the electric pen comprising:

a body holdable by a user and positionally movable by the user over a surface to draw images when the electric pen is in the data input mode, the body having an internal space;

a position detector that measures positional displacement and speed of the body that accompanies movement of the body by the user to draw the images, the position detector producing a signal based on the measured positional displacement and speed of the body that represents the images;

a signal detector that detects the signal produced by the position detector based on the measured positional displacement and speed of the body;

a printing mechanism disposed in the internal space of the body that prints the images based on the signal detected by the signal detector when the electric pen is in the data output mode;

data transmission/reception means for transmitting data to and receiving data from the external data processor, the external data processor converting the signal detected by the signal detector into a print signal; and control means for controlling the data transmission/ reception means to transmit the signal detected by the signal detector to the external data processor and to receive the print signal converted by the external data processor based on the signal, and for controlling the printing mechanism to print the images based on the print signal received from the external data processor.

17. A combination according to claim 16, wherein the printing mechanism comprises a plurality of color print heads and an ink source.

18. A combination according to claim 16, wherein the data transmission/reception means transmits and receives data via infrared ray transmission.

19. A combination according to claim 16, wherein the data transmission/reception means transmits and receives data via a conductive wire connecting the electric pen and the external data processor.

* * * * *